(12) United States Patent
Miyamoto et al.

(10) Patent No.: US 10,782,645 B2
(45) Date of Patent: Sep. 22, 2020

(54) RECORDING APPARATUS

(71) Applicant: SEIKO EPSON CORPORATION, Tokyo (JP)

(72) Inventors: Shintaro Miyamoto, Shiojiri (JP); Muhamad Gigih Agung Pratomo, Depok-Jawa Barat (ID); Muklis Tri Haryadi, Bayudono-Boyolall (ID)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/590,862

(22) Filed: Oct. 2, 2019

(65) Prior Publication Data

US 2020/0110355 A1 Apr. 9, 2020

(30) Foreign Application Priority Data

Oct. 3, 2018 (JP) .................................. 2018-188448

(51) Int. Cl.
*G03G 21/16* (2006.01)
*B41J 29/02* (2006.01)
(Continued)

(52) U.S. Cl.
CPC .......... *G03G 21/1661* (2013.01); *B41J 29/02* (2013.01); *B60J 7/1614* (2013.01);
(Continued)

(58) Field of Classification Search
CPC .......... E05C 17/00; E05C 17/04; E05C 17/12; E05C 17/16; E05C 17/18; E05C 17/20; B41J 29/02; G03G 21/1623; G03G 21/1628; G03G 21/1633; G03G 21/1661; G03G 2221/1678; G03G 2221/1684; G03G 2221/1687; H04N 1/00519; B65F 1/16;
(Continued)

(56) References Cited

U.S. PATENT DOCUMENTS 1,468,460 A * 9/1923 Di Carlo .................. E05C 17/18
                                                         217/60 C
1,986,307 A * 1/1935 Wagner .................. A45C 13/34
                                                         217/60 C (Continued)

FOREIGN PATENT DOCUMENTS

JP          3545681       7/2004
JP     2012-144859     8/2012
(Continued)

*Primary Examiner* — Ryan D Walsh
(74) *Attorney, Agent, or Firm* — Workman Nydegger (57) ABSTRACT

A recording apparatus includes a lower unit including a recording unit that performs recording on a medium, and an upper unit including a reading unit that reads a document image, the upper unit being disposed above the lower unit and being configured to open and close with respect to the lower unit. The upper unit includes an arm that maintains an open state of the upper unit by being supported by the lower unit. The lower unit has a cam groove that receives a protrusion disposed on the arm and that has a route along which the protrusion moves in a certain direction when the upper unit opens or closes. A recess that the protrusion enters and that supports the protrusion from below is disposed in the cam groove and the open state of the upper unit is maintained by the protrusion entering the recess.

10 Claims, 13 Drawing Sheets

(51) Int. Cl.

| | | |
|---|---|---|
| *E05D 11/10* | (2006.01) | |
| *E05C 17/16* | (2006.01) | |
| *B65D 43/24* | (2006.01) | |
| *E05C 17/12* | (2006.01) | |
| *E05C 17/00* | (2006.01) | |
| *E05C 17/18* | (2006.01) | |
| *B65D 43/16* | (2006.01) | |
| *H04N 1/00* | (2006.01) | |
| *B65F 1/16* | (2006.01) | |
| *B60J 7/16* | (2006.01) | |
| *E05C 17/04* | (2006.01) | |
| *E05C 17/20* | (2006.01) | |
| *E05F 3/22* | (2006.01) | |

(52) U.S. Cl.
CPC ............ *B60J 7/1621* (2013.01); *B65D 43/16* (2013.01); *B65D 43/166* (2013.01); *B65D 43/24* (2013.01); *B65F 1/16* (2013.01); *B65F 1/1646* (2013.01); *E05C 17/00* (2013.01); *E05C 17/04* (2013.01); *E05C 17/12* (2013.01); *E05C 17/16* (2013.01); *E05C 17/18* (2013.01); *E05C 17/20* (2013.01); *E05D 11/10* (2013.01); *G03G 21/1623* (2013.01); *G03G 21/1628* (2013.01); *G03G 21/1633* (2013.01); *H04N 1/00519* (2013.01); *E05F 2003/228* (2013.01); *G03G 2221/1678* (2013.01); *G03G 2221/1684* (2013.01); *G03G 2221/1687* (2013.01)

(58) Field of Classification Search
CPC ..... B65F 1/1646; B65D 43/16; B65D 43/166; B65D 43/24; E05F 2003/228; B60J 7/1614; B60J 7/1621; E05D 11/10
See application file for complete search history.

(56) References Cited

U.S. PATENT DOCUMENTS

| | | | | |
|---|---|---|---|---|
| 2,076,860 | A * | 4/1937 | North | E05C 17/085 217/60 C |
| 2,090,473 | A * | 8/1937 | Crabb | E05C 17/085 217/60 C |
| 2,587,200 | A * | 2/1952 | Nottingham | E05C 17/20 217/60 C |
| 4,742,598 | A * | 5/1988 | Bruneau | E05F 1/1066 16/286 |
| 5,311,253 | A * | 5/1994 | Ohmori | G03G 21/1867 399/111 |
| 5,414,898 | A * | 5/1995 | Gastaldi | A45C 13/34 16/345 |
| 5,570,493 | A * | 11/1996 | Gulick | A61G 17/02 16/357 |
| 5,588,259 | A * | 12/1996 | Kolefas | E05C 17/16 292/268 |
| 7,680,431 | B2 * | 3/2010 | Ikebata | G03G 21/1628 399/107 |
| 8,875,939 | B2 * | 11/2014 | Phillips | B65D 43/24 220/832 |
| 9,004,212 | B2 * | 4/2015 | Noda | B66C 13/52 16/348 |
| 9,677,309 | B2 * | 6/2017 | Zhou | G07D 11/00 |
| 2002/0118403 | A1 * | 8/2002 | Kameyama | H04N 1/00543 358/474 |
| 2006/0029424 | A1 * | 2/2006 | Kawai | B41J 29/02 399/125 |
| 2006/0088336 | A1 * | 4/2006 | Hirose | G03G 15/60 399/110 |
| 2007/0292159 | A1 * | 12/2007 | Iijima | G03G 21/1628 399/110 |
| 2010/0040394 | A1 * | 2/2010 | Iijima | H04N 1/00519 399/107 |
| 2012/0099888 | A1 * | 4/2012 | Ohgi | G03G 15/6552 399/107 |
| 2013/0188209 | A1 | 7/2013 | Horikawa et al. | |
| 2014/0028170 | A1 * | 1/2014 | Ito | G03G 21/16 312/327 |
| 2014/0203694 | A1 * | 7/2014 | Watanabe | B41J 29/02 312/319.2 |
| 2016/0098007 | A1 * | 4/2016 | Doi | G03G 21/1633 49/394 |
| 2018/0034989 | A1 | 2/2018 | Fujibayashi et al. | |
| 2019/0162000 | A1 * | 5/2019 | Krishnamoorthy | G05G 5/18 |

FOREIGN PATENT DOCUMENTS

| | | |
|---|---|---|
| JP | 2013-150247 | 8/2013 |
| JP | 2018-019341 | 2/2018 |

* cited by examiner

RECORDING APPARATUS

The present application is based on, and claims priority from JP Application Serial Number 2018-188448, filed Oct. 3, 2018, the disclosure of which is hereby incorporated by reference herein in its entirety.

BACKGROUND

1. Technical Field

The present disclosure relates to a recording apparatus that performs recording on a medium.

2. Related Art

There have hitherto been known so-called multifunction printers in which a printer and a scanner are integrated into a single apparatus. For example, JP-A-2012-144859 describes an example of such multifunction printers.

The printer described in JP-A-2012-144859 includes a scanner unit above a printer unit. The scanner unit is disposed so as to open and close with respect to the printer unit and is configured to be held in an open state by an upright portion.

An engagement member is disposed at the tip of the upright portion. The engagement member is configured to move in a closing guide groove in a certain direction in conjunction with opening or closing of the scanner unit. A spring that laterally presses the engagement member is disposed in the closing guide groove. The open state of the scanner unit is maintained by laterally pressing the engagement member with the spring to provide sliding resistance to the engagement member.

In the configuration described in JP-A-2012-144859, the spring has to be set to have a high pressing force to reliably maintain the open state of the scanner unit. Thus, when the scanner unit opens or closes, the scanner unit becomes stiff in the vicinity of the region in which a high pressing force of the spring is applied to the engagement member, and accordingly the usability is reduced.

SUMMARY

A recording apparatus according to an aspect of the present disclosure includes a lower unit including a recording unit that performs recording on a medium, and an upper unit including a reading unit that reads a document image, the upper unit being disposed above the lower unit and being configured to open and close with respect to the lower unit. The upper unit includes an arm that maintains an open state of the upper unit by being supported by the lower unit. The lower unit has a cam groove that receives a protrusion disposed on the arm and that has a route along which the protrusion moves in a certain direction when the upper unit opens or closes. A recess that the protrusion enters and that supports the protrusion from below is disposed in the cam groove and the open state of the upper unit is maintained by the protrusion entering the recess.

DESCRIPTION OF EXEMPLARY EMBODIMENTS

The gist of the present disclosure will be described below.
In a first aspect of the disclosure, a recording apparatus includes a lower unit including a recording unit that performs recording on a medium, and an upper unit including a reading unit that reads a document image, the upper unit being disposed above the lower unit and being configured to open and close with respect to the lower unit. The upper unit includes an arm that maintains an open state of the upper unit by being supported by the lower unit. The lower unit has a cam groove that receives a protrusion disposed on the arm and that has a route along which the protrusion moves in a certain direction when the upper unit opens or closes. A recess that the protrusion enters and that supports the protrusion from below is disposed in the cam groove and the open state of the upper unit is maintained by the protrusion entering the recess.

According to the aspect, the recess that the protrusion enters and that supports the protrusion from below is disposed in the cam groove that receives the protrusion of the arm disposed in the upper unit, and the open state of the upper unit is maintained by the protrusion entering the recess. This configuration enables the usability to be restrained from being reduced because the protrusion does not have to be laterally pressed in the cam groove to maintain the open state of the upper unit, and thus the upper unit is unlikely to become stiff when the upper unit opens or closes.

In a second aspect of the disclosure, in the recording apparatus according to the first aspect, the cam groove has a first route along which the protrusion passes when the upper unit in a closed state opens and a second route along which the protrusion passes when the upper unit in the open state closes, and the recess is disposed on the second route and in a region in which the protrusion moves from the first route to the second route.

According to the aspect, the recess is disposed on the second route and in the region in which the protrusion moves from the first route to the second route, and thus the upper unit can be held in a first open position, in which the upper unit is open, and a second open position having an opening angle thereof less than that of the first open position. Accordingly, even if a user releases their hold on the upper unit in the first open position, in which the upper unit is open, the upper unit is not immediately shifted to the completely closed state but temporarily stops in the second open position. Thus, this configuration enables reductions in noise generation and of damage to the apparatus, both of which are caused by closing the upper unit with great force.

In a third aspect of the disclosure, the recording apparatus according to the second aspect further includes a regulating portion that regulates the protrusion so as not to enter the second route from the first route and that is disposed in a region in which the protrusion moves from the second route to the first route.

According to the aspect, the recording apparatus further includes the regulating portion that regulates the protrusion so as not to enter the second route from the first route and that is disposed in the region in which the protrusion moves from the second route to the first route. Thus, this configuration enables the protrusion to be regulated so as to move in an appropriate direction.

In a fourth aspect of the disclosure, in the recording apparatus according to the third aspect, the regulating portion is configured to elastically deform when the protrusion moves from the second route to the first route and includes a deformation portion configured not to elastically deform in a direction in which the protrusion moves from the first route to the second route.

According to the aspect, the regulating portion is configured to elastically deform when the protrusion moves from the second route to the first route and includes the deformation portion configured not to elastically deform in the direction in which the protrusion moves from the first route to the second route. Thus, this configuration enables the regulating portion to have a simple structure and to be formed at low cost.

In a fifth aspect of the disclosure, in the recording apparatus according to the fourth aspect, the deformation portion is integrally formed with a member that forms the cam groove.

According to the aspect, the deformation portion is integrally formed with the member that forms the cam groove, and thus this configuration enables the regulating portion to be formed at lower cost.

In a sixth aspect of the disclosure, in the recording apparatus according to the fourth aspect, the deformation portion is formed separately from a member that forms the cam groove.

According to the aspect, the deformation portion is formed separately from the member that forms the cam groove, and thus this configuration enables the elasticity of the deformation portion to be set flexibly and the design flexibility thereof to be increased.

In a seventh aspect of the disclosure, in the recording apparatus according to any one of the first to sixth aspects, the arm includes a pressing portion that presses the arm such that the protrusion moves in the certain direction.

According to the aspect, the arm includes the pressing portion that presses the arm such that the protrusion moves in the certain direction, and thus this configuration enables the protrusion to move appropriately in the certain direction.

In an eighth aspect of the disclosure, in the recording apparatus according to any one of the first to seventh aspects, the cam groove has a guide surface that is disposed above the recess and that guides the protrusion in the certain direction.

According to the aspect, the cam groove has the guide surface that is disposed above the recess and that guides the protrusion in the certain direction. Thus, this configuration enables the protrusion to be regulated so as to move in the appropriate direction when the upper unit in a state in which the protrusion is supported by the recess, that is, in a state in which the open position of the upper unit is maintained, closes.

The disclosure will be described in detail below.

Hereinafter, an ink jet printer 1 (simply referred to as a printer 1 below) is an example of the recording apparatus according to the disclosure. A method of performing recording on a sheet, which is an example of a medium, is not limited to an ink jet method, and various methods including an electrophotographic method and a dot impact method can be employed.

Such an ink jet method includes various configurations, such as a configuration in which an ink cartridge is mounted on a carriage and a configuration in which an ink container disposed outside a carriage is coupled to the carriage via an ink tube. The disclosure is applicable to any of such configurations. The printer 1 according to the present embodiment has a configuration in which an ink cartridge is mounted in a carriage.

In the X-Y-Z coordinate system illustrated in each drawing, the X direction is the apparatus width direction and the sheet width direction with respect to a lower unit 2, the Y direction is the apparatus depth direction and the sheet transport direction when recording is performed on a sheet in the lower unit 2, and the Z direction is the apparatus height direction and the vertical direction. In addition, the +Y direction is the direction in which the apparatus front surface is viewed from the apparatus rear surface, and the −Y direction is the direction in which the apparatus rear surface is viewed from the apparatus front surface.

The apparatus front surface is the surface facing a user of the apparatus. The side of the apparatus that is to be regarded as the apparatus front surface is determined in accordance with a configuration and an exterior design of the apparatus. For example, when an operation unit that is configured to include various operation buttons and a display and that is operated by a user is disposed in an apparatus, the side on which the operation unit is disposed is the side facing a user in many cases.

Hereinafter, the direction in which a sheet is transported is referred to as "downstream", and the opposite direction is referred to as "upstream".

Figure 1:
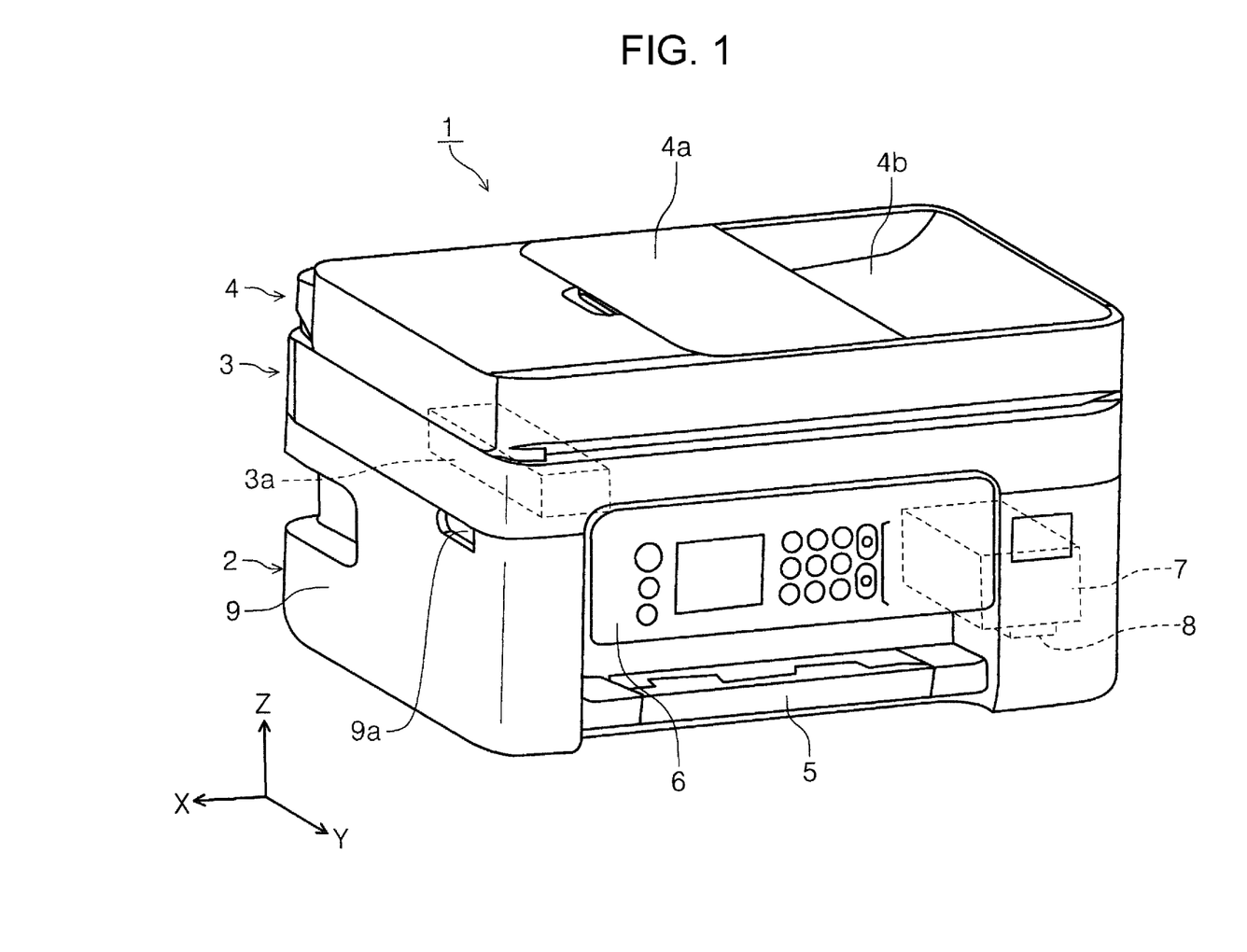
FIG. 1 is an external perspective view of a printer.

In FIG. 1, the printer 1 includes the lower unit 2 and an upper unit 3. The lower unit 2 performs recording on a sheet. The upper unit 3 is configured as a scanner, which is an example of an image reading device. That is, the printer 1 is a so-called multifunction printer.

A document feeder 4, which automatically feeds a plurality of documents, is disposed above the upper unit 3. The document feeder 4 pivots around a pivot shaft (not illustrated) with respect to the upper unit 3. Pivoting and opening the document feeder 4 exposes a document platen (not illustrated).

The document feeder 4 is integrated with the upper unit 3, and the upper unit 3 pivots and opens or closes with respect to the lower unit 2, which is described in detail below.

Figure 2:
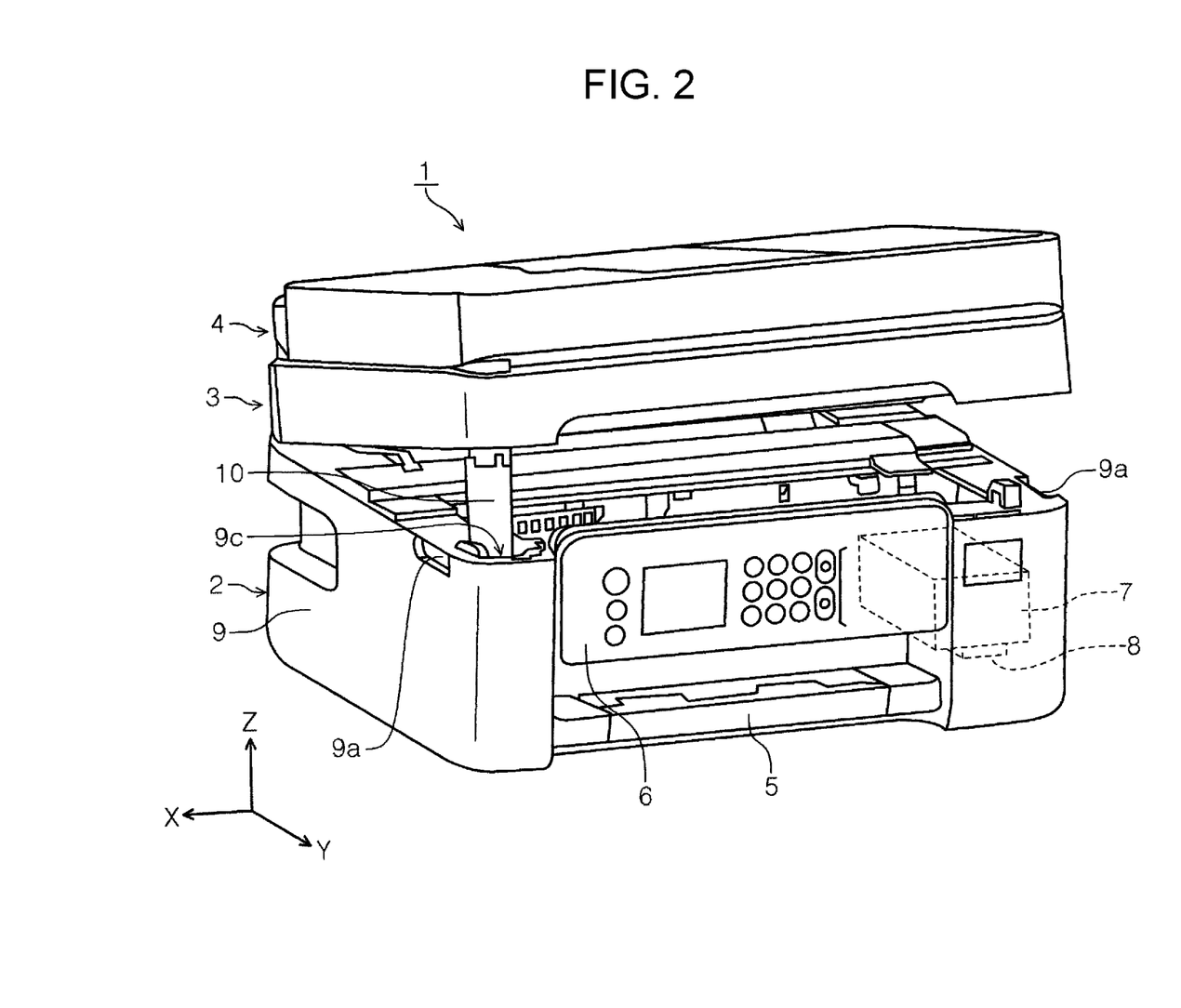
FIG. 2 is an external perspective view of the printer.
Figure 3:
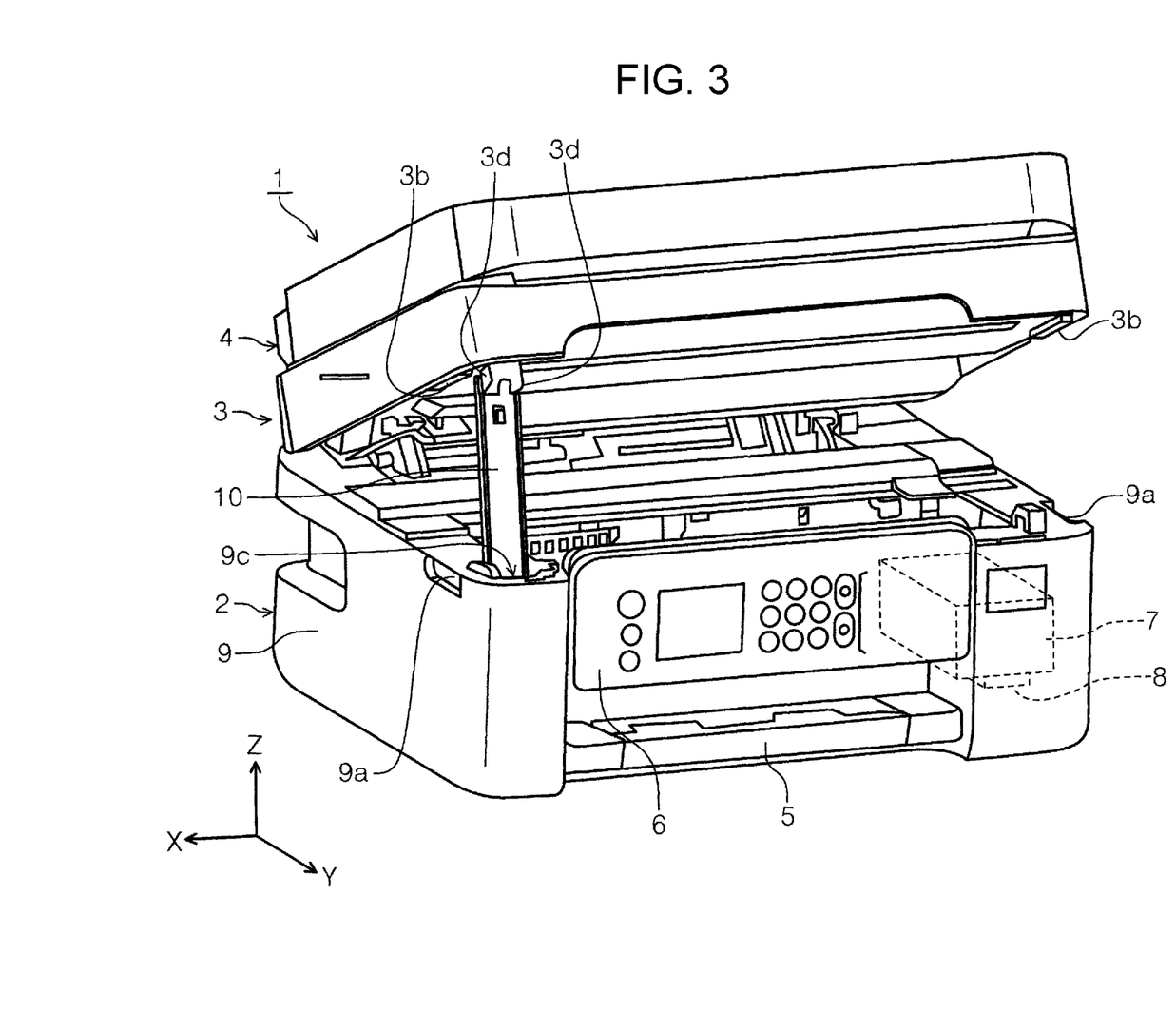
FIG. 3 is an external perspective view of the printer.

Recesses 9a are disposed in the corresponding side surfaces of the lower unit 2 (see also FIGS. 2 and 3). The bottom surface of the lower unit 2 can be held with fingers by inserting thumbs into the recesses 9a, and then the lower unit 2 can be lifted. In the upper unit 3, finger hold portions 3b (FIG. 3), which are to be held with fingers, are formed into a planar shape so as to be easily held with fingers.

The upper unit 3 is a flatbed scanner and includes the document platen and a reading unit 3a. A document mounted on the document platen is read by the reading unit 3a moving in the X direction.

An operation unit 6 is disposed in the front surface of the lower unit 2. The operation unit 6 includes a plurality of operation buttons and a display. In the embodiment, the operation unit 6 is configured as a user interface for controlling recording and image reading in the printer 1.

A sheet discharge tray 5 is disposed under the operation unit 6 in the front surface of the lower unit 2. The sheet discharge tray 5 receives a sheet, an example of a medium, on which recording is performed and which is discharged.

Figure 12:
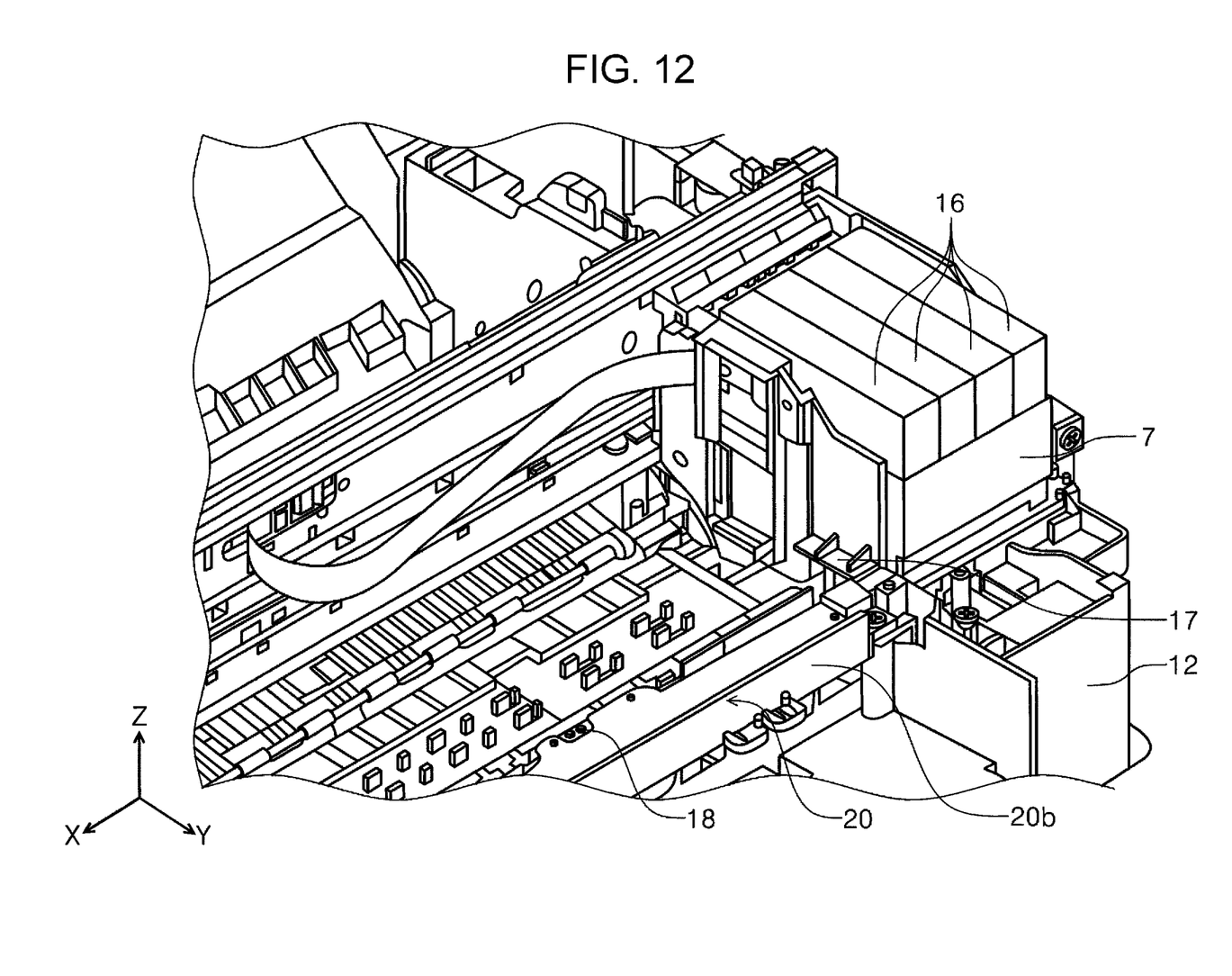
FIG. 12 is a partial enlarged perspective view of the inside of the casing of the printer.

The lower unit 2 includes a carriage 7 in which a recording head 8 is disposed. The recording head 8 is a recording unit that performs recording on a sheet. As illustrated in FIG. 12, a plurality of ink cartridges 16 are disposed in the carriage 7.

A prism (not illustrated) is disposed in the bottom of each ink cartridge 16. The ink cartridge 16 has a function of detecting the amount of ink remaining through the prism. In FIG. 12, the reference numeral 18 indicates an optical sensor disposed in a region in which the carriage 7 moves. The amount of ink remaining of each ink cartridge 16 can be detected through the prism by stopping the carriage 7 above the optical sensor 18.

A shading portion 17 is disposed on a side surface of the carriage 7. The shading portion 17 reduces the influence of natural light when the optical sensor 18 detects the amount of ink remaining.

Figure 13:
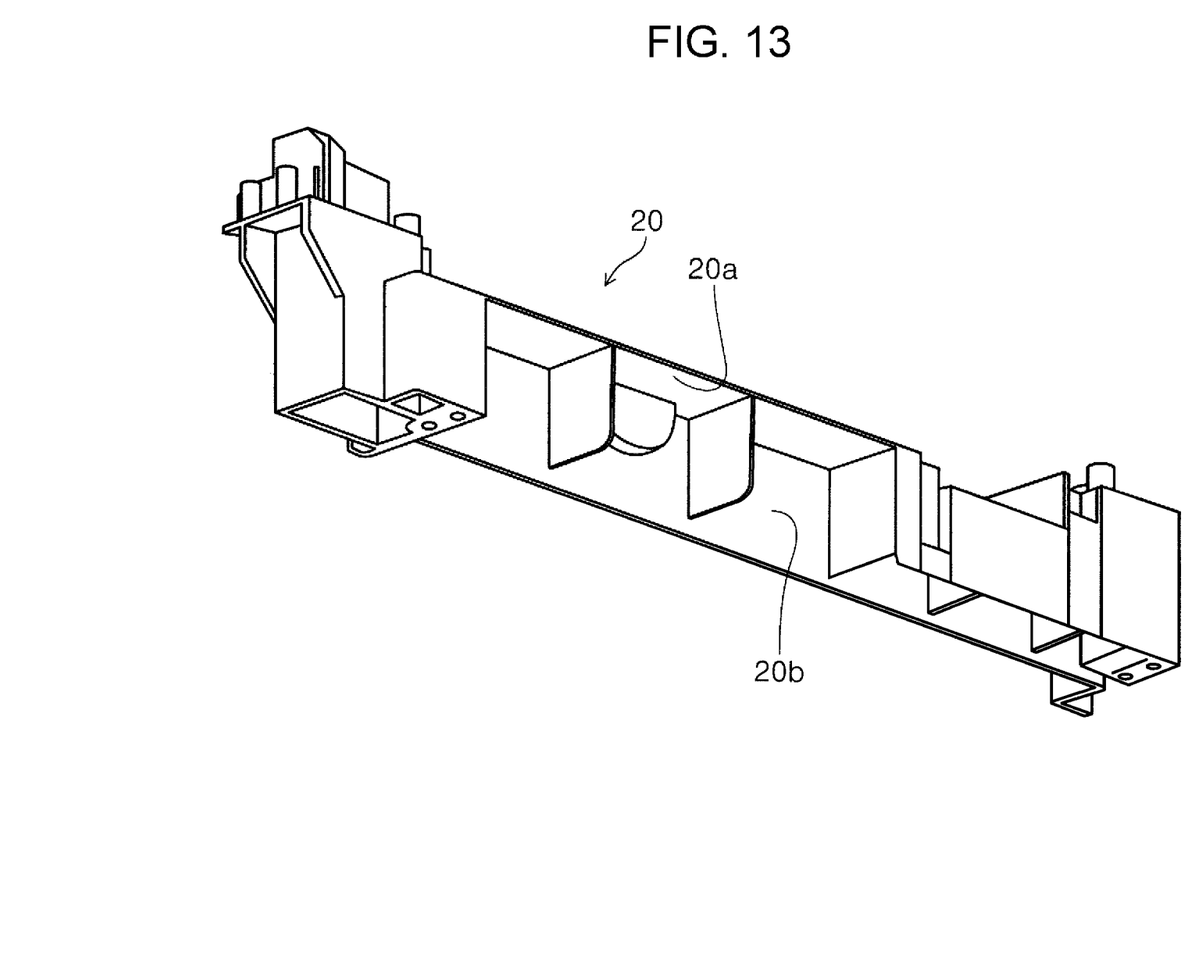
FIG. 13 is a perspective view of a frame.

As illustrated in FIG. 13, an eaves portion 20*a* is disposed in a frame 20 disposed in front of the carriage 7. The eaves portion 20*a* is positioned, in the vertical direction, above the surface onto which ink is ejected by the recording head 8. The eaves portion 20*a* and a wall 20*b*, which extends in the vertical direction, reduce leakage, to the outside of the printer 1, of airborne ink mist not landing on a sheet among the ink ejected from the recording head 8. The frame 20 has an open structure under the eaves portion 20*a*, and ink mist can move comparatively freely in the region partitioned by the eaves portion 20*a* and the wall 20*b*. Thus, leakage of ink mist to the outside of the printer 1 due to movement of the carriage 7 can be more effectively reduced.

Next, an arm that maintains an open state of the upper unit 3 and cam grooves that support the arm will be described.

Figure 6:
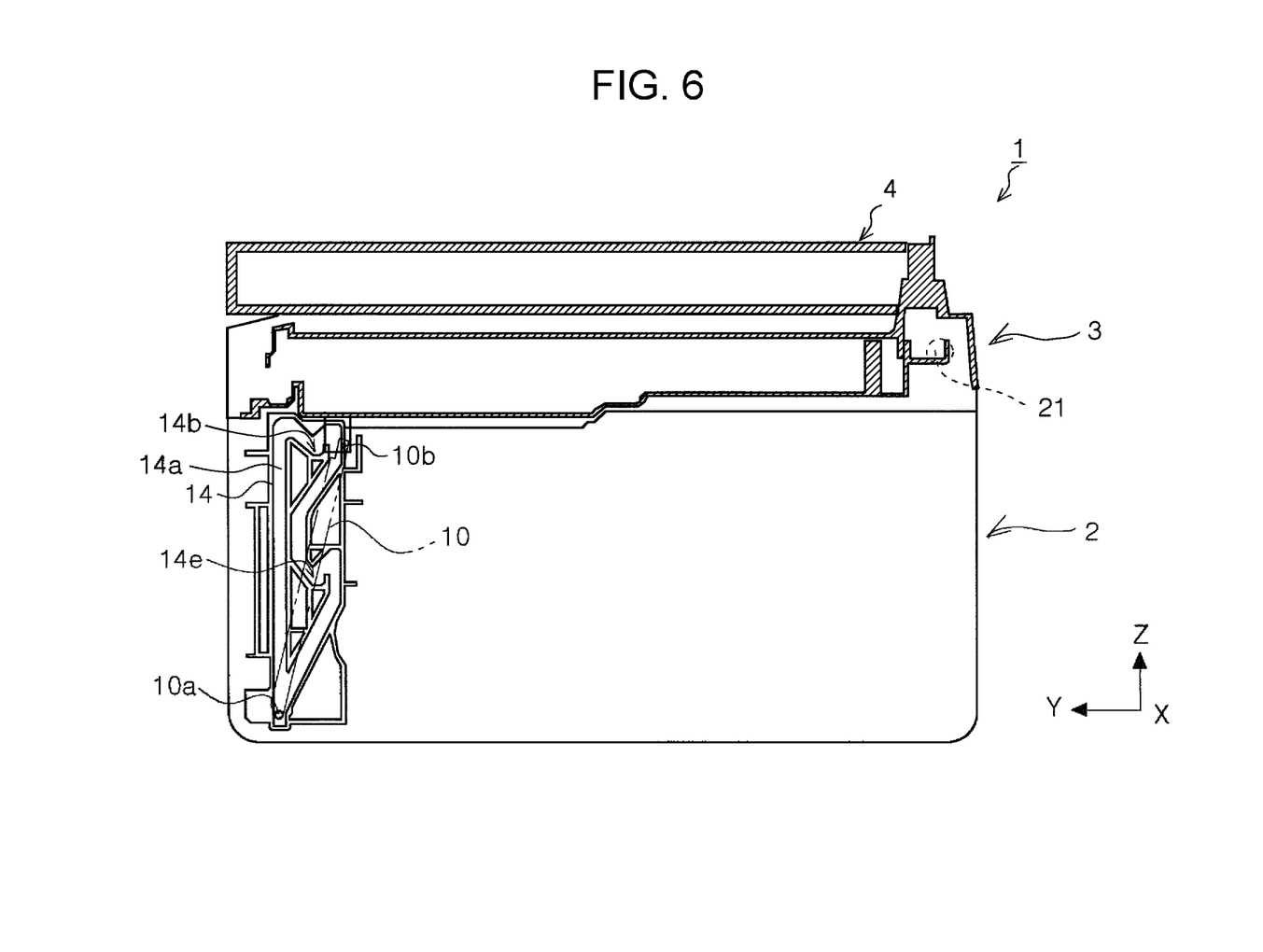
FIG. 6 is a schematic side sectional view of the printer.

The upper unit 3 is coupled to and configured to pivot with respect to the lower unit 2 via a hinge 21 (FIG. 6). The upper unit 3 includes an arm 10 as illustrated in FIGS. 2 and 3 and is configured to maintain the open state thereof by the arm 10 being supported by the lower unit 2.

In the embodiment, the upper unit 3 is configured to maintain the open state in two positions: a first open position illustrated in FIG. 3; a second open position illustrated in FIG. 2. The second open position has an opening angle less than that of the first open position.

Figure 4:
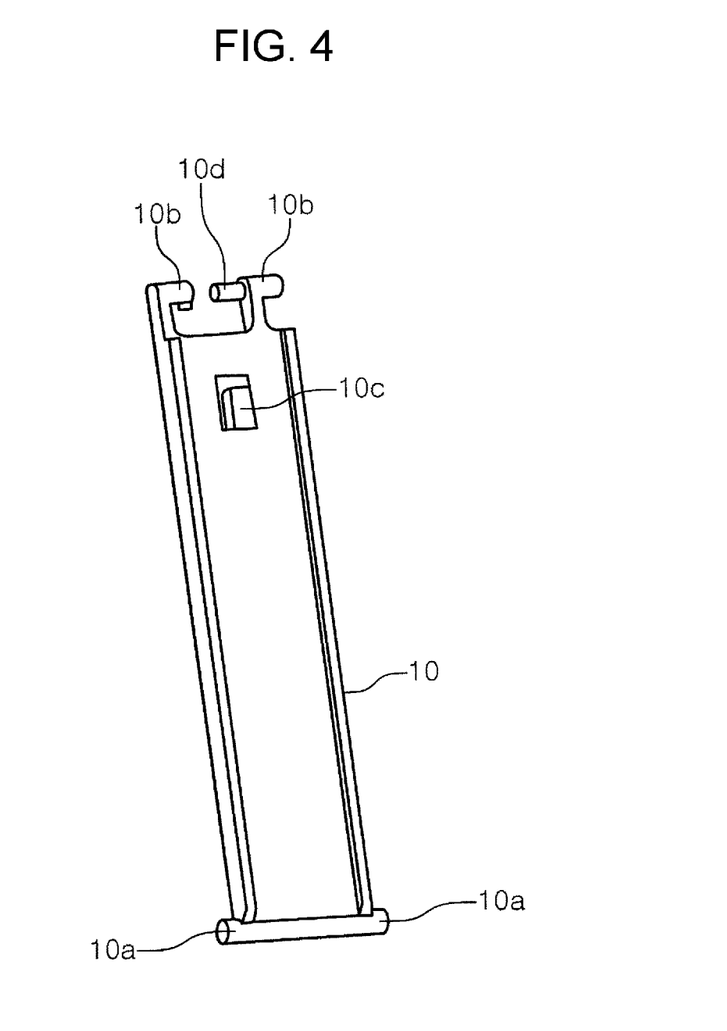
FIG. 4 is an external perspective view of an arm.
Figure 5:
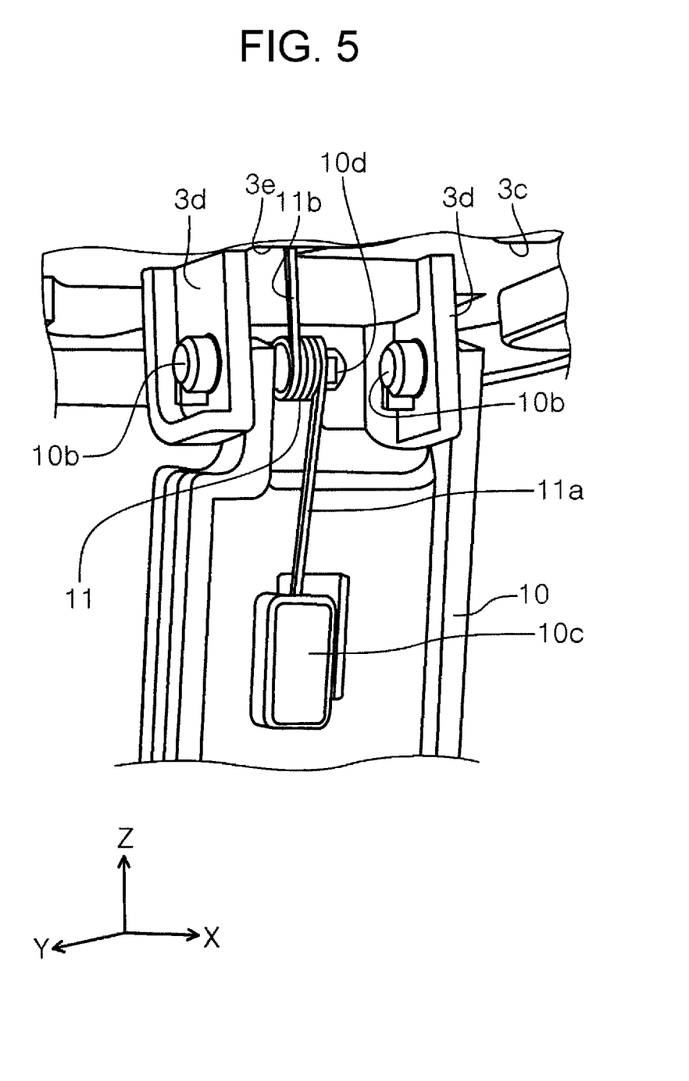
FIG. 5 is a partial enlarged view of the arm.

As illustrated in FIG. 4, two pivot shafts 10*b* are disposed in the upper portion of the arm 10, and two protrusions 10*a* are disposed in the lower portion of the arm 10. As illustrated in FIG. 5, the pivot shafts 10*b* are supported by the corresponding supports 3*d* disposed on the bottom of the upper unit 3 so as to pivot.

The operating procedure for the arm 10 (not illustrated) is indicated in a position of the arm 10 visible to a user.

A spring holding portion 10*d* is formed between the two pivot shafts 10*b*. A torsion spring 11 is held by the spring holding portion 10*d*.

An one end 11*a* of the torsion spring 11 is hooked on a spring hook portion 10*c* formed in the arm 10, and an other end 11*b* of the torsion spring 11 is hooked on a spring hook portion 3*e* formed in the bottom surface of the upper unit 3. This configuration causes the torsion spring 11 to press the arm 10 toward the rear of the printer 1. That is, the torsion spring 11 presses the arm 10 so as to pivot around the pivot shafts 10*b* in a counterclockwise direction in FIGS. 6 to 8.

Figure 11:
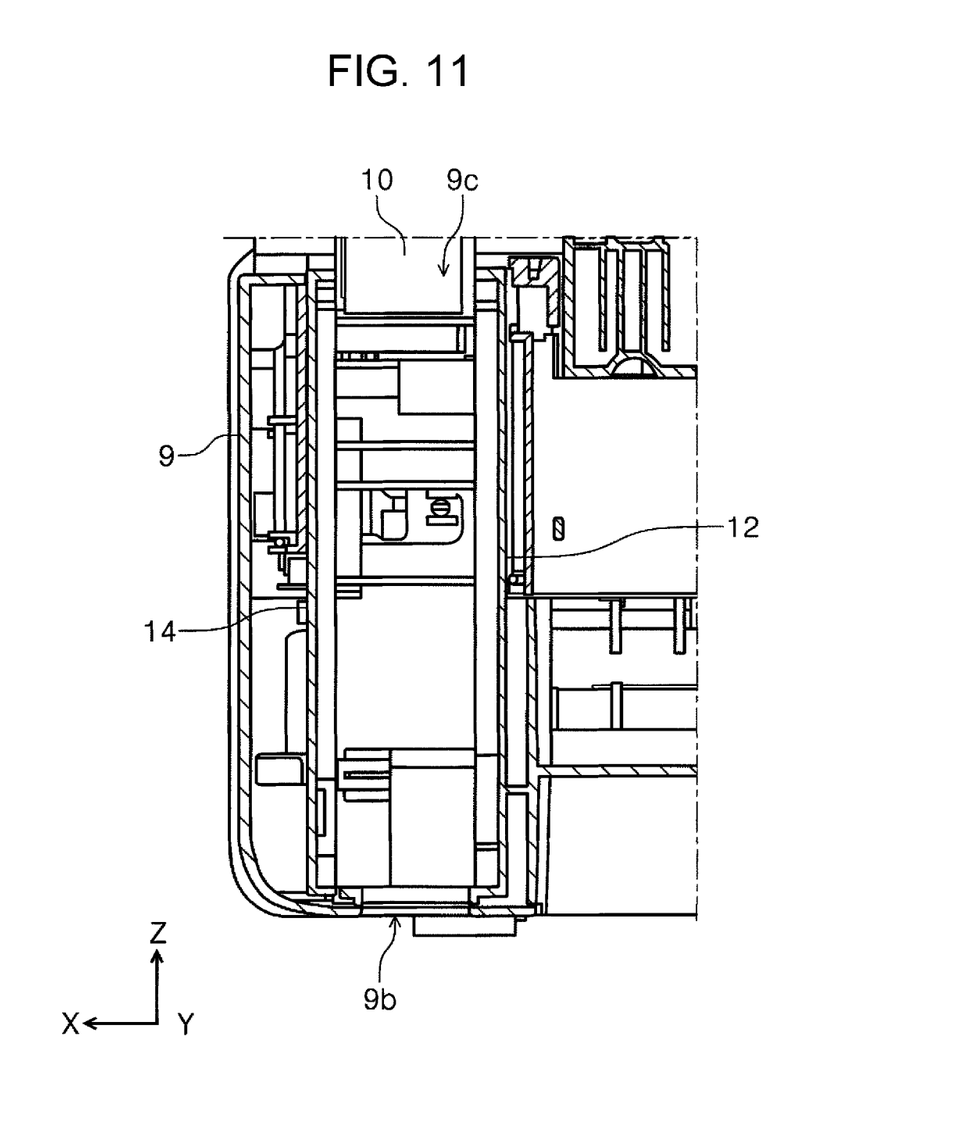
FIG. 11 is a partial sectional view of the printer.

The arm 10 enters a casing 9 through an upper opening 9*c* (FIGS. 2, 3, and 11) formed in the upper portion of the casing 9 forming the contour of the lower unit 2. As illustrated in FIG. 11, the arm 10 is in a state of being interposed between a first frame member 12 and a second frame member 14, which form the lower unit 2. The respective protrusions 10*a* formed on the corresponding sides of the arm 10 are received in the corresponding cam grooves (described below), which are formed in the first frame member 12 and the second frame member 14, and are guided when the upper unit 3 opens or closes.

The cam grooves formed in the first frame member 12 and the second frame member 14 are shaped symmetrically with respect to the arm 10. A regulating portion (described below) that regulates movement of the protrusion 10*a* is disposed in only the cam groove of the second frame member 14.

Figure 10:
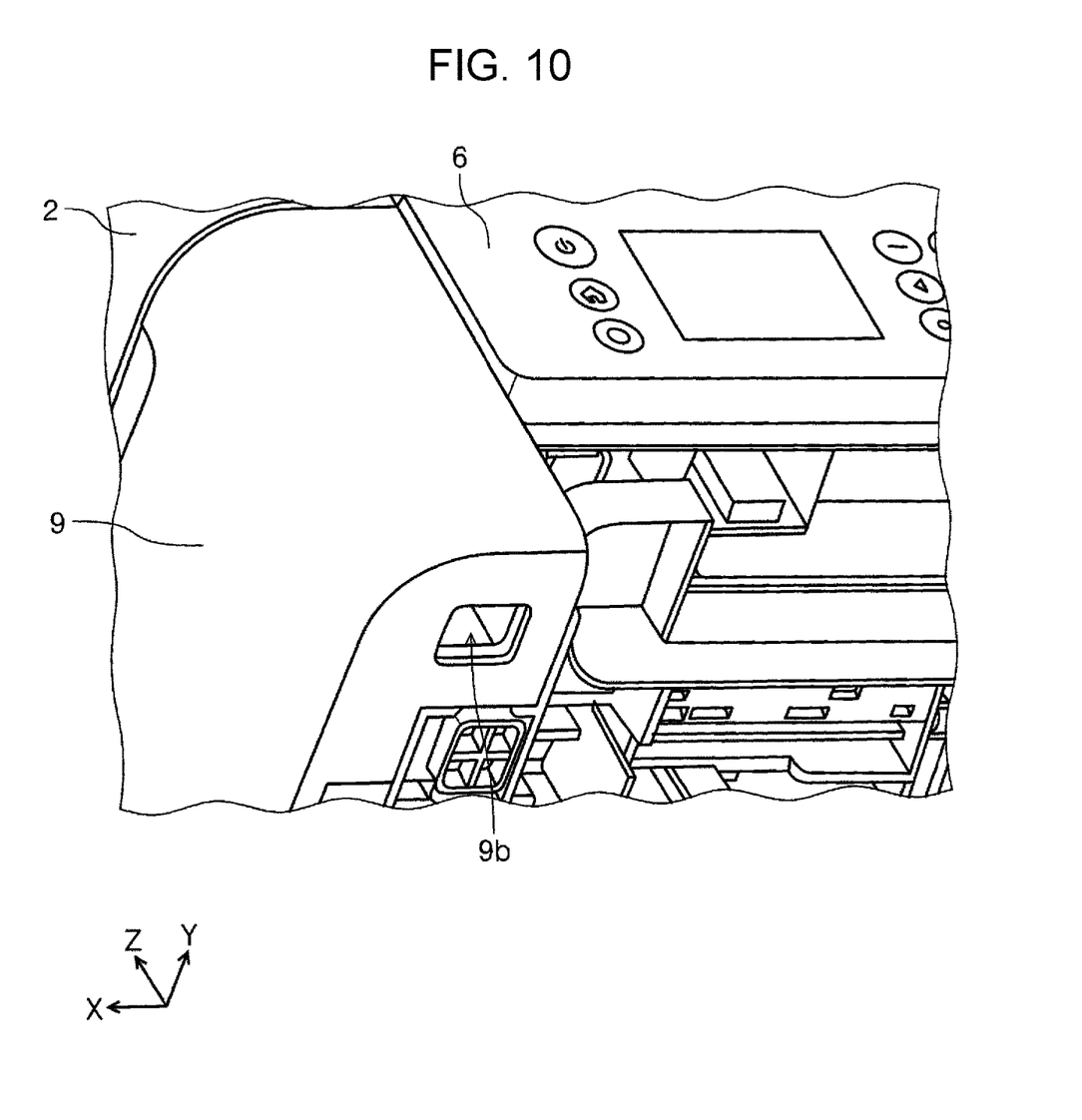
FIG. 10 is a partial enlarged perspective view of the printer.

As illustrated in FIGS. 10 and 11, a lower opening 9*b* is formed under the upper opening 9*c* formed in the upper portion of the casing 9. The casing 9 is configured such that even if, for example, foreign matter enters the casing 9 through the upper opening 9*c*, the foreign matter is discharged to the outside of the printer 1 through the lower opening 9*b*.

Figure 9:
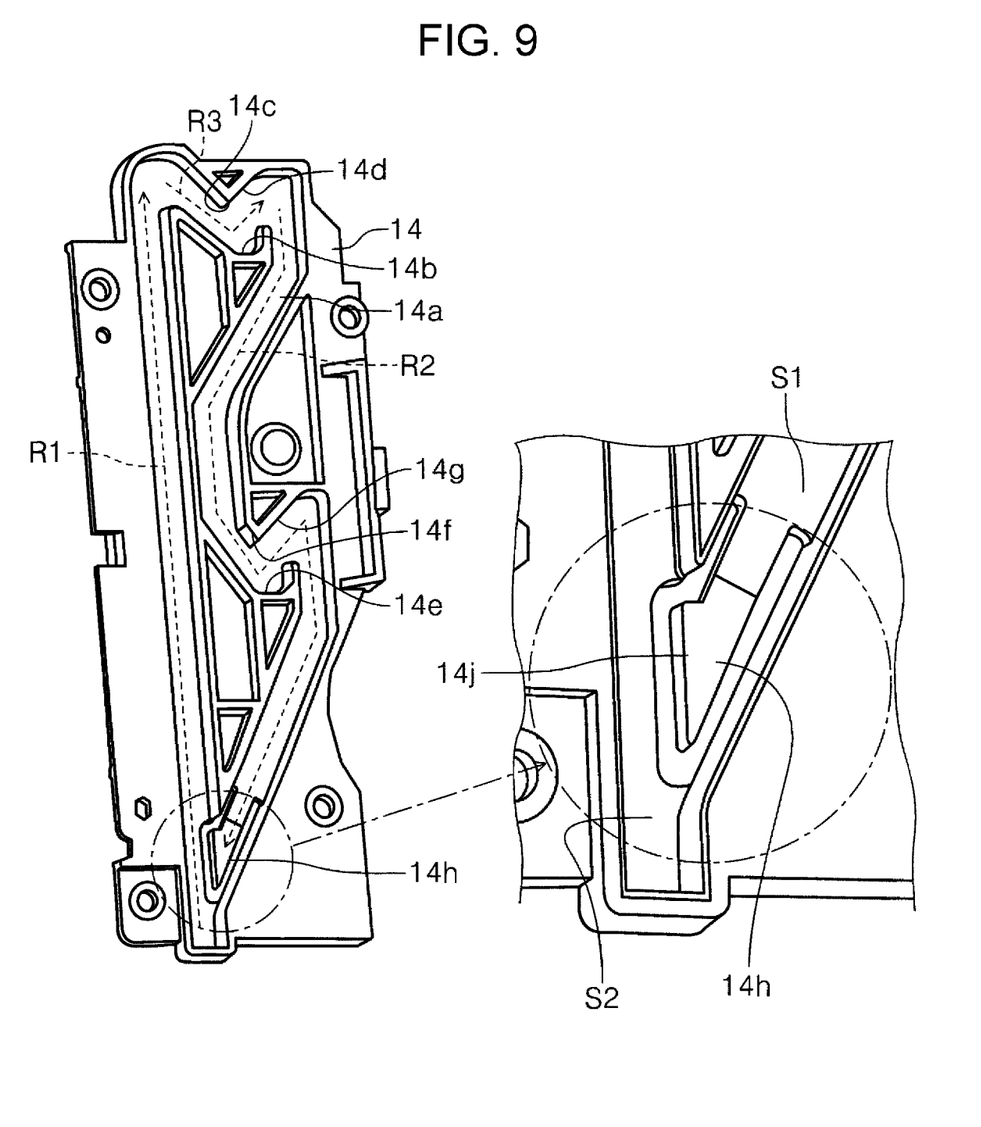
FIG. 9 is a perspective view of a second frame member.

FIG. 9 illustrates a cam groove 14*a*, which is formed in the second frame member 14. The cam groove (not illustrated) formed in the first frame member 12 also has a structure similar to that of the cam groove 14*a* except that a deformation portion 14*h* (described below), which functions as a regulating portion, is not disposed therein and that the shape thereof is symmetrical to that of the cam groove 14*a* formed in the second frame member 14.

The cam groove guides and supports the protrusion 10*a* of the arm 10, that is, supports the upper unit 3. Thus, the cam groove does not necessarily have to be disposed on both sides of the arm 10 and may be formed in any one of the first frame member 12 and the second frame member 14, which are disposed such that the arm 10 is interposed therebetween.

However, the protrusions 10*a* can be more appropriately guided and supported by disposing the cam groove in each of the first frame member 12 and the second frame member 14, which are disposed such that the arm 10 is interposed therebetween.

In the embodiment, although the gaps between the protrusions 10*a* of the arm 10 and the corresponding bottom surfaces of the cam grooves, that is, the gaps in the X direction are relatively small, each protrusion 10*a* may be configured to move in the corresponding cam groove while the protrusion 10*a* and the bottom surface of the cam groove are always in contact with each other.

Hereinafter, the shape of the cam groove 14*a* will be described in detail with reference to FIG. 9. The width of the cam groove 14*a* is set to be larger than the diameter of the protrusion 10*a*. That is, the width of the cam groove 14*a* is configured such that the protrusion 10*a* smoothly moves in the cam groove 14*a*.

When the upper unit 3 opens or closes, the protrusion 10*a* moves in the cam groove 14*a*, and the moving direction is a certain direction. In FIG. 9, the moving direction of the protrusion 10*a* is the certain direction indicated by arrows.

The cam groove 14*a* has a first route R1, a second route R2, and a transition route R3. The first route R1 is the route along which the protrusion 10*a* passes when the upper unit 3 in a closed state opens. The second route R2 is the route along which the protrusion 10*a* passes when the upper unit 3 in an open state closes. The transition route R3 is a region in which the protrusion 10*a* passes when the protrusion 10*a* moves from the first route R1 to the second route R2.

The first route R1 is shaped so as to extend substantially vertically upward. The second route R2 is shaped so as to wind vertically downward. The transition route R3 is shaped so as to extend, from the upper end, that is, the terminal end of the first route R1, obliquely downward and then obliquely upward toward the upper end, that is, the starting end of the second route R2.

In FIG. 9, each arrow indicated by a dashed line has a starting position that is the starting end position of the corresponding route and a finishing position that is the terminal end position of the corresponding route.

A first recess 14b is disposed on the transition route R3. The protrusion 10a enters the first recess 14b, and the first recess 14b supports the protrusion 10a from below. In addition, a second recess 14e is disposed on the second route R2. The protrusion 10a enters the second recess 14e, and the second recess 14e supports the protrusion 10a from below.

When the upper unit 3 is in the closed state, the protrusion 10a is, as illustrated in FIG. 6, in the lowest position in the cam groove 14a, that is, at the starting end of the first route R1.

When the upper unit 3 in a state in which the protrusion 10a is positioned at the starting end of the first route R1 opens, the protrusion 10a moves vertically upward along the first route R1 and reaches the upper end, that is, the terminal end of the first route R1.

Figure 8:
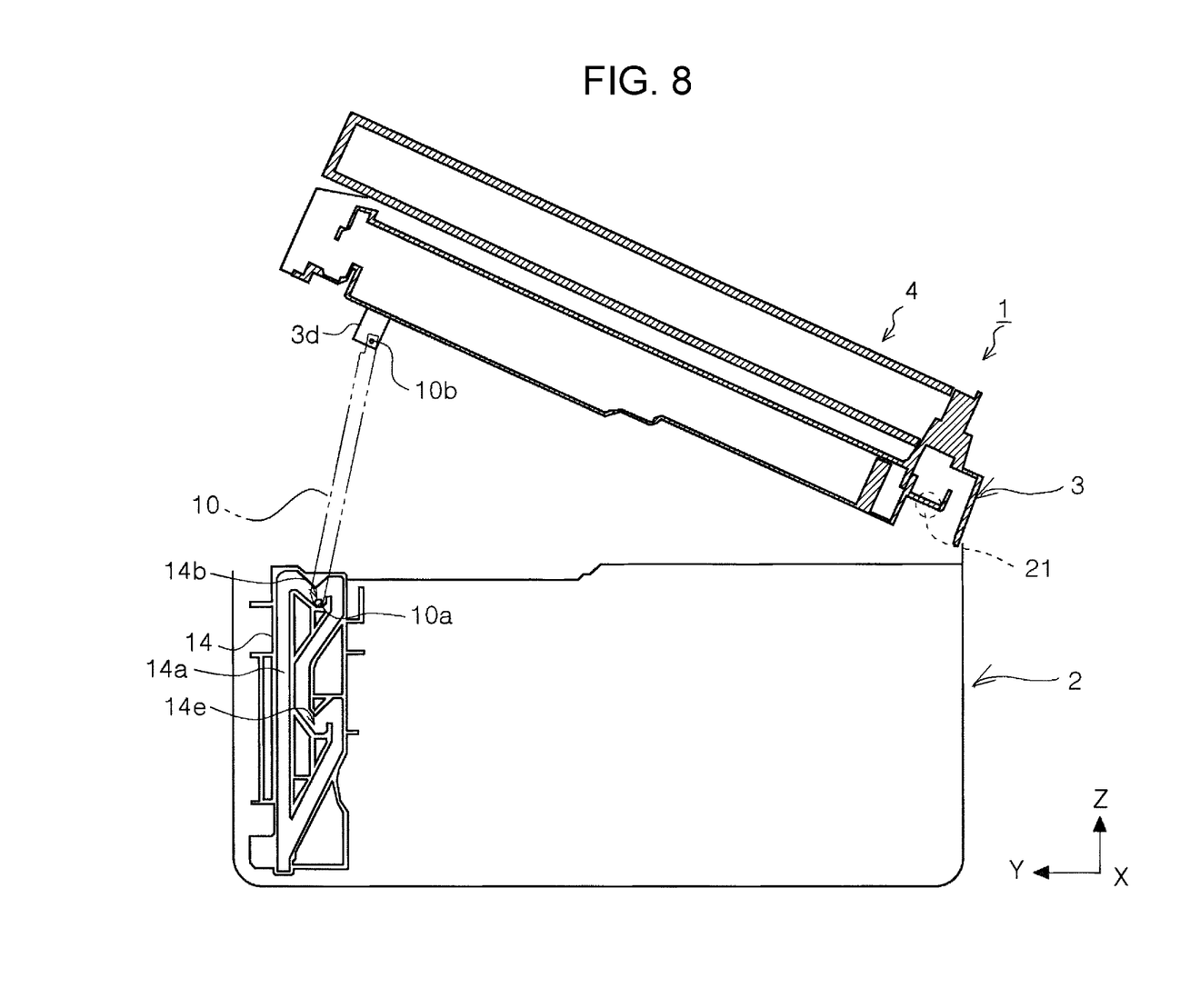
FIG. 8 is a schematic side sectional view of the printer.

When a user releases their hold on or stops lifting the upper unit 3 in a state in which the protrusion 10a is positioned at the terminal end of the first route R1, the protrusion 10a moves toward the first recess 14b due to the arm 10 being pressed in the clockwise direction in FIG. 8, enters the first recess 14b, and is supported by the first recess 14b. That is, as illustrated in FIG. 8, the upper unit 3 is maintained in the first open position.

Subsequently, when a user lifts the upper unit 3 slightly in a state in which the protrusion 10a is positioned in the first recess 14b, the protrusion 10a moves toward the starting end of the second route R2 due to the arm 10 being pressed in the clockwise direction in FIG. 8.

Figure 7:
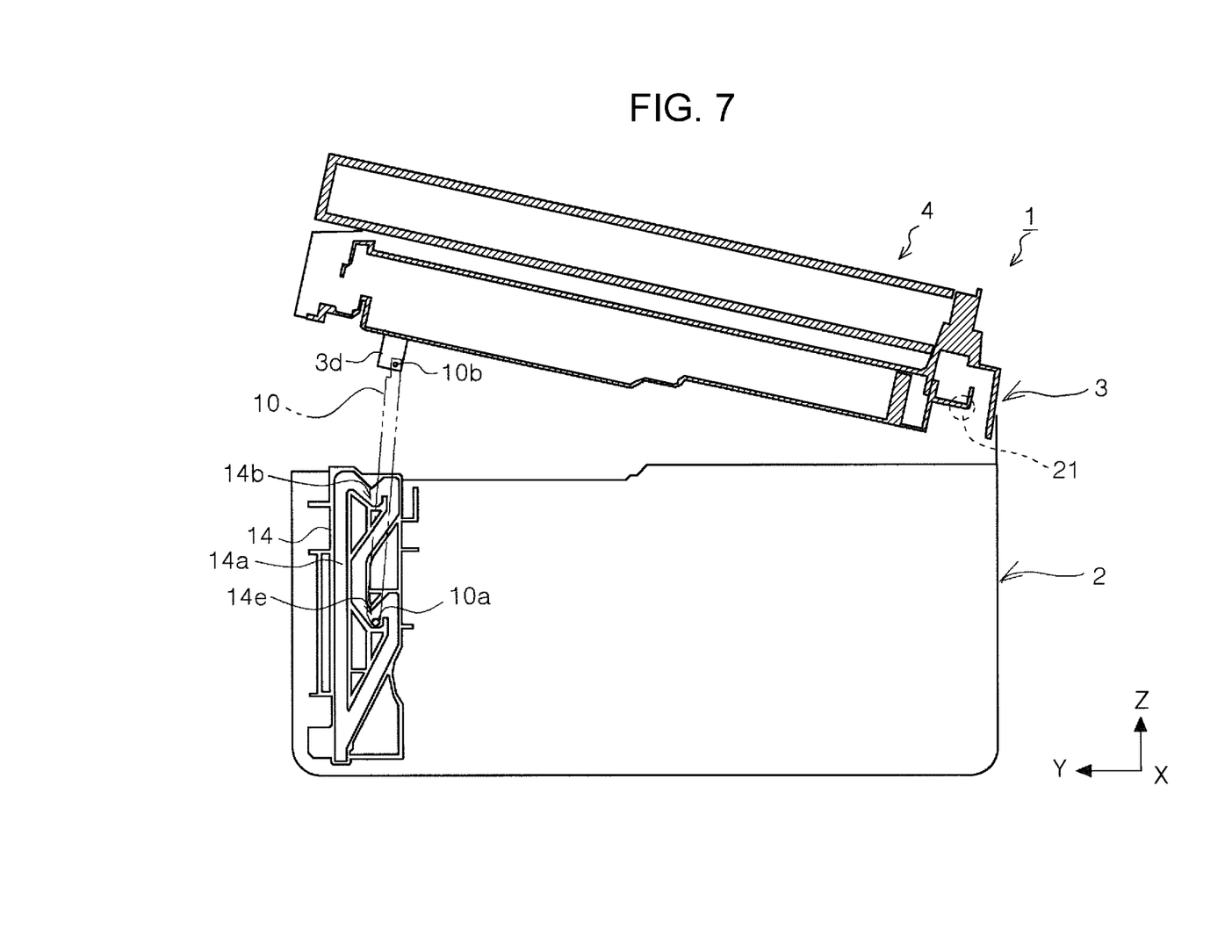
FIG. 7 is a schematic side sectional view of the printer.

Thus, when a user releases their hold on or stops lifting the upper unit 3 in a state in which the protrusion 10a is positioned at the starting end of the second route R2, the protrusion 10a moves downward along the second route R2, as illustrated in FIG. 7, enters the second recess 14e, and is supported by the second recess 14e. That is, the upper unit 3 is maintained in the second open position.

When a user lifts the upper unit 3 slightly in a state in which the protrusion 10a is positioned in the second recess 14e, the protrusion 10a is removed from the second recess 14e due to the arm 10 being pressed in the clockwise direction in FIG. 7. Then, when a user releases their hold on or stops lifting the upper unit 3 in a state in which the protrusion 10a is removed from the second recess 14e, the protrusion 10a moves further downward along the second route R2 and moves from the terminal end of the second route R2 to the starting end of the first route R1. That is, as illustrated in FIG. 6, the upper unit 3 is in a completely closed state. In the completely closed state of the upper unit 3, the protrusion 10a is not supported by the lower end of the first route R1, but the bottom surface of the upper unit 3 is supported by the upper surface of the lower unit 2.

In this manner, the protrusion 10a continues to move in the cam groove 14a in the certain direction in conjunction with opening or closing of the upper unit 3.

As described above, the first recess 14b and the second recess 14e, which the protrusion 10a enters and which support the protrusion 10a from below, are disposed in the cam groove 14a, and the open state of the upper unit 3 is maintained by the protrusion 10a entering the first recess 14b or the second recess 14e. This configuration enables the usability to be restrained from being reduced because the protrusion 10a does not have to be laterally pressed in the cam groove 14a to maintain the open state of the upper unit 3, and thus the upper unit 3 is unlikely to become stiff when the upper unit 3 opens or closes.

Even if a user releases their hold on the upper unit 3 in a wide open state, that is, in the first open position, the upper unit 3 is not immediately shifted to the completely closed state but temporarily stops in the second open position illustrated in FIG. 7 due to the second recess 14e being disposed on the second route R2. Thus, this configuration enables reductions in noise generation and of damage to the printer 1, both of which are caused by closing the upper unit 3 with great force.

In the embodiment, the regulating portion is disposed in a region in which the protrusion 10a moves from the second route R2 to the first route R1, that is, at the terminal end of the second route R2. The regulating portion regulates the protrusion 10a so as not to enter the first route R1, that is, move backward. The regulating portion is formed of the deformation portion 14h illustrated in FIG. 9.

In the enlarged view of the deformation portion 14h in FIG. 9, the surface indicated by reference S1, that is, the bottom surface of the second route R2 and the surface indicated by reference S2, that is, the bottom surface of the first route R1 are formed so as to be substantially flush with each other. The deformation portion 14h is formed so as to be positioned higher than the surfaces.

Thus, when the protrusion 10a moves from the second route R2 to the first route R1, the protrusion 10a has to deform and push away the deformation portion 14h.

However, the deformation portion 14h has a cantilever structure as illustrated in FIG. 9. In this structure, if the protrusion 10a attempts to reverse to the second route R2 after moving from the second route R2 to the first route R1, the protrusion 10a is caught by an end 14j of the deformation portion 14h and thus is unable to reverse to the second route R2, that is, to move backward.

That is, the cam groove 14a is provided with the deformation portion 14h, which functions as a regulating portion. The deformation portion 14h regulates the protrusion 10a so as not to enter the second route R2 from the first route R1, that is, move backward and thus can regulate the protrusion 10a so as to move in the appropriate direction.

In addition, the regulating portion is configured to elastically deform when the protrusion 10a moves from the second route R2 to the first route R1 and is formed of the deformation portion 14h configured not to elastically deform in the direction in which the protrusion 10a moves from the first route R1 to the second route R2. Thus, the regulating portion has a simple structure and is formed at low cost.

The deformation portion 14h is integrally formed, by resin molding, with the second frame member 14, which is a member forming the cam groove 14a. This configuration enables the regulating portion to be formed at lower cost.

The deformation portion 14h is not limited to the configuration but may be formed separately from the second frame member 14, which forms the cam groove 14a. Examples of such a component as an alternative to the deformation portion 14h include a leaf spring. As described above, if the deformation portion 14h is formed separately from the second frame member 14, which forms the cam groove 14a, the elasticity of the deformation portion 14h can be set flexibly, and thus the design flexibility thereof can be increased.

The arm 10 is pressed by the torsion spring 11, which functions as a pressing portion, so as to move in a certain direction, that is, an appropriate moving direction. Thus, the protrusion 10a can move appropriately in the certain direction.

In the embodiment, guide surfaces (first and second inclined surfaces 14d and 14g described below) are disposed in the cam groove 14a, and thus the torsion spring 11 can be omitted. That is, even if the torsion spring 11 is omitted, the protrusion 10a can continue to move in the cam groove 14a in the certain direction.

Subsequently, the guide surfaces above will be described. The cam groove 14a has the respective guide surfaces above the first recess 14b and the second recess 14e. The guide surfaces guide the protrusion 10a in the certain direction.

Specifically, as illustrated in FIG. 9, a first protrusion 14c is disposed above the first recess 14b. The position of the first protrusion 14c and the position of the first recess 14b vary in the apparatus depth direction, that is, the Y direction. When the protrusion 10a entering the first recess 14b moves vertically upward, the protrusion 10a comes into contact with the first inclined surface 14d, which functions as the guide surface, and is guided in the certain direction in which the protrusion 10a is to be moved (rightward in FIG. 9).

In a similar manner, a second protrusion 14f is disposed above the second recess 14e such that the position of the second protrusion 14f and the position of the second recess 14e vary in the apparatus depth direction, that is, the Y direction. When the protrusion 10a entering the second recess 14e moves vertically upward, the protrusion 10a comes into contact with the second inclined surface 14g, which functions as the guide surface, and is guided in the certain direction in which the protrusion 10a is to be moved (rightward in FIG. 9).

Such a configuration enables the protrusion 10a to be regulated so as to move in the appropriate direction.

The disclosure is not limited to the embodiment described above, and various modifications can be made within the scope of the disclosure described in the claims. Needless to say, these modifications are also within the scope of the disclosure.

What is claimed is:

1. A recording apparatus comprising:
a lower unit including a recording unit that performs recording on a medium; and
an upper unit including a reading unit that reads a document image, the upper unit being disposed above the lower unit and being configured to open and close with respect to the lower unit, wherein
the upper unit includes an arm that maintains an open state of the upper unit by being supported by the lower unit,
the lower unit has a cam groove that receives a protrusion disposed on the arm and that has a route along which the protrusion moves in a certain direction when the upper unit opens or closes,
a recess that the protrusion enters and that supports the protrusion from below is disposed in the cam groove and the open state of the upper unit is maintained by the protrusion entering the recess, and
a regulating portion disposed in the route and regulates the protrusion to not move in a direction different from the certain direction.

2. The recording apparatus according to claim 1, wherein the cam groove has
a first route along which the protrusion passes when the upper unit in a closed state opens and
a second route along which the protrusion passes when the upper unit in the open state closes and
the recess is disposed on the second route and in a region in which the protrusion moves from the first route to the second route.

3. The recording apparatus according to claim 2, wherein the regulating portion regulates the protrusion so as not to enter the second route from the first route, the regulating portion being disposed in a region in which the protrusion moves from the second route to the first route.

4. The recording apparatus according to claim 3, wherein the regulating portion is configured to elastically deform when the protrusion moves from the second route to the first route and includes a deformation portion configured not to elastically deform in a direction in which the protrusion moves from the first route to the second route.

5. The recording apparatus according to claim 4, wherein the deformation portion is integrally formed with a member that forms the cam groove.

6. The recording apparatus according to claim 4, wherein the deformation portion is formed separately from a member that forms the cam groove.

7. The recording apparatus according to claim 1, wherein the arm includes a pressing portion that presses the arm such that the protrusion moves in the certain direction.

8. The recording apparatus according to claim 1, wherein the cam groove has a guide surface that is disposed above the recess and that guides the protrusion in the certain direction.

9. A recording apparatus comprising:
a lower unit including a recording unit that performs recording on a medium; and
an upper unit including a reading unit that reads a document image, the upper unit being disposed above the lower unit and being configured to open and close with respect to the lower unit, wherein
the upper unit includes an arm that maintains an open state of the upper unit by being supported by the lower unit,
the lower unit has a cam groove that receives a protrusion disposed on the arm and that has a route along which the protrusion moves in a certain direction when the upper unit opens or closes,
a first recess that the protrusion enters and that supports the protrusion from below is disposed in the cam groove and a first open state of the open state of the upper unit is maintained by the protrusion entering the first recess,
a second recess that the protrusion enters and that supports the protrusion from below is disposed in the cam groove downstream of the first recess and a second open state of the open state of the upper unit is maintained by the protrusion entering the second recess,
wherein, the first open state is different from the second open state and the route guides the protrusion away from the second recess along the route before guiding the protrusion toward the second recess.

10. The recording apparatus according to claim 9, further comprising
a regulating portion that regulates the protrusion so as not to moves in a different direction from the certain direction is disposed in the route.

* * * * *